(12) United States Patent
Oike et al.

(10) Patent No.: US 9,157,783 B2
(45) Date of Patent: Oct. 13, 2015

(54) METHOD FOR PRODUCING CONDUCTIVE SEGMENT

(75) Inventors: Toshio Oike, Shimada (JP); Kenichi Tanaka, Shimada (JP); Ryo Hirose, Shimada (JP); Takafumi Shimizu, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 190 days.

(21) Appl. No.: 13/555,396

(22) Filed: Jul. 23, 2012

(65) Prior Publication Data

US 2013/0025366 A1    Jan. 31, 2013

(30) Foreign Application Priority Data

Jul. 25, 2011 (JP) .................................. 2011-162465
Sep. 5, 2011 (JP) .................................. 2011-193012

(51) Int. Cl.
| | |
|---|---|
| B05D 5/12 | (2006.01) |
| G01F 23/36 | (2006.01) |
| H01C 1/142 | (2006.01) |
| H01C 17/28 | (2006.01) |
| C22C 5/02 | (2006.01) |

(Continued)

(52) U.S. Cl.
CPC . *G01F 23/36* (2013.01); *C22C 5/02* (2013.01); *C22C 5/06* (2013.01); *H01C 1/142* (2013.01); *H01C 17/281* (2013.01); *B05D 3/02* (2013.01); *B05D 5/12* (2013.01); *B05D 7/50* (2013.01); *B32B 15/01* (2013.01); *Y10T 428/12889* (2015.01)

(58) Field of Classification Search
USPC ........... 427/97.1, 97.3, 97.4, 97.6, 98.4, 99.2, 427/123, 125, 258, 419.1
See application file for complete search history.

(56) References Cited

U.S. PATENT DOCUMENTS 3,268,744 A * 8/1966 Kaiser et al. .................. 307/327
3,717,483 A * 2/1973 Miller .......................... 106/1.13

(Continued)

FOREIGN PATENT DOCUMENTS

| JP | 60224745 A | 11/1985 |
|---|---|---|
| JP | 6184789 A | 7/1994 |

(Continued)

OTHER PUBLICATIONS

Office Action dated Mar. 31, 2015, issued by the Japanese Intellectual Property Office in counterpart Japanese Application No. 2011-162465.

(Continued)

*Primary Examiner* — Brian K Talbot
(74) *Attorney, Agent, or Firm* — Sughrue Mion, PLLC

(57) ABSTRACT

A method for producing a conductive segment, includes: a step of printing a metal conductive paste on a substrate, and drying the paste; a step of printing other metal conductive paste on the metal conductive paste after drying, and drying the paste; and a step of burning the metal conductive paste after drying and the other metal conductive paste after drying, wherein the conductive metal paste is an Ag—Pd conductive paste comprising silver (Ag) and palladium (Pd), and the other metal conductive paste is an Au conductive paste comprising gold (Au) as a main component; or the metal conductive paste is an Au conductive paste comprising gold (Au) as a main component, and the other metal conductive paste is an Ag—Pd conductive paste comprising silver (Ag) and palladium (Pd).

8 Claims, 16 Drawing Sheets

(51) Int. Cl.
*C22C 5/06* (2006.01)
*B05D 7/00* (2006.01)
*B05D 3/02* (2006.01)
*B32B 15/01* (2006.01)

(56) References Cited

U.S. PATENT DOCUMENTS

| | | | | |
|---|---|---|---|---|
| 4,822,641 | A | * | 4/1989 | Weik .............................. 427/250 |
| 5,800,932 | A | * | 9/1998 | Suzuki et al. .................. 428/615 |
| 6,681,628 | B2 | | 1/2004 | Sawert et al. |
| 6,972,685 | B2 | * | 12/2005 | Sato et al. ..................... 340/620 |
| 6,985,068 | B2 | * | 1/2006 | Dedert et al. ................. 338/162 |
| 7,591,178 | B2 | * | 9/2009 | Ireland et al. ................... 73/313 |
| 2007/0163341 | A1 | * | 7/2007 | Nagakura et al. ............... 73/305 |

FOREIGN PATENT DOCUMENTS

| | | |
|---|---|---|
| JP | 2003287456 A | 10/2003 |
| JP | 200727501 A | 2/2007 |
| JP | 2008300607 A | 12/2008 |
| JP | 2009162694 A | 7/2009 |

OTHER PUBLICATIONS

Office Action dated Apr. 21, 2015, issued by the Japanese Intellectual Property Office in counterpart Japanese Application No. 2011-193012.

\* cited by examiner

METHOD FOR PRODUCING CONDUCTIVE SEGMENT

BACKGROUND OF THE INVENTION

The present invention relates to a method for producing a conductive segment, and a conductive segment. More particularly, the invention relates to a method for producing a conductive segment used as an electrode of a resistance plate of a liquid level detector detecting a liquid level height of a transportation fuel tank of automobiles, aircraft and the like, and a conductive segment produced by the production method.

A liquid level detector in which a float arm slides on a resistance plate by a float moving up and down according to a liquid level is conventionally known as a liquid level detector detecting a liquid level height of a fuel tank of, for example, automobiles.

One example of a liquid level detector is described below. FIG. 1 is an electrical block diagram for explaining a structural example of a sensor used in a liquid level sensor. FIG. 2 is an explanatory view for explaining a structural example of a liquid level detector. FIG. 3 is an explanatory view for explaining a structural example of a variable resistor in a sensor.

A sensor 2 of a liquid level detector 1 is equipped with a variable resistor 3 changing a resistance value in the course of movement of contacts 19 and 20 described hereinafter in conjunction with height transition of a liquid level in the inside T of a fluid tight vessel, and the variable resistor 3 is connected to a fixed resistor 7 in series and connected to a power circuit 4 applying a given voltage to the variable resistor 3 and the fixed resistor 7.

As shown in FIG. 2 and FIG. 3, the sensor 2 includes a resistance plate 13 attached to a body frame 12, and a sliding body contactor 14 connected to one end of a float arm 11 having attached to other end thereof a float 10 floating on a liquid level by buoyancy of a liquid. The resistance plate 13 of the sensor 2 is provided with a first conductive pattern 15 and a second conductive pattern 16 as electrodes, and those two conductive patterns 15 and 16 are arranged in a state of being parallel to each other in an arc shape centering a rotation axis 21 of the float arm 11. An input-output conductive part 17 is connected to one end of the first conductive pattern 15, and an input-output conductive pattern 18 is connected to one end of the second conductive pattern 16.

The first conductive pattern 15 is constituted of a plurality of conductive segments 15a arranged at given intervals in a circumferential direction of the arc shape, and a resistor 15b electrically connecting the plurality of conductive segments 15a to each other. The second conductive pattern 16 is constituted of a plurality of conductive segments 16a arranged at given intervals in a circumferential direction of the arc shape, and a coupling body 16b electrically connecting a plurality of the conductive segments 16a to each other.

Two contacts 19 and 20 electrically connected to each other are provided on the sliding body contactor 14. Furthermore, a rotation axis 21 located at other end of the float arm 11 is connected to the sliding body contactor 14. The float arm 11 circles in an arrow Y direction of FIG. 3 centering the rotation axis 21 by that the float 10 floating on a liquid level moves in a lower direction from the position of a liquid level when filled up, according to the amount of consumption. The sliding body contactor 14 also turns in an arrow Y direction of FIG. 3 according to the turning of the float arm 11. By the turning motion of the sliding body contactor 14, the contacts 19 and 20 electrically contact while sliding on the respective conductive segments 15a and 16a arranged on the first conductive pattern 15 and the second conductive pattern 16. By this, length of the resistor 15b located in a circuit between the input-output conductive part 17 connected to the first conductive pattern 15 and the input-output conductive part 18 connected to the second conductive pattern 16 changes, and a resistance value of the circuit changes (that is, a resistance value of the variable resistor 3 in FIG. 1 changes). Thus, the variable resistor 3 is constituted of the first conductive pattern 15, the second conductive pattern 16 and the sliding body contactor 14.

When voltage is applied to the variable resistor 3, the sensor 2 detects potential difference between the input-output conductive parts 17 and 18 and outputs its output signal to a processing circuit 5, and the processing circuit 5 indicates a residual amount of a liquid to an indicator such as a meter 6 in analog display or bar graph display, based on an output signal of the sensor 2. In the meter 6, a fixed resistor may be arranged on a wiring to the processing circuit 5.

In the liquid level detector, a material of the contact generally uses a silver-palladium (AgPd) alloy, a silver-copper (AgCu) alloy, a silver-nickel (AgNi) alloy and the like. The conductive segment includes, for example, a mixture of a silver-palladium (AgPd) powder and a glass, and is obtained by mixing a silver powder, a palladium powder and a glass powder to obtain a paste, printing the paste on a resistance plate, drying the paste and then burning the paste.

The liquid level detector is sometimes used in a fuel tank of automobiles using an electrolyte (alcohol) such as ethanol or methanol, or gasoline containing the electrolyte, as a fuel. Silver (Ag) has small electric resistance and has excellent conductivity. However, contacts and conductive segments deteriorate or corrode by sulfur content, moisture, alcohol content and the like in a fuel, resulting in poor conduction. As a result, drawbacks such that measurement cannot be performed and incorrect values are obtained may occur. On the other hand, an insulating material is formed by sulfurization of a conductive segment itself and sulfurization of an abrasion powder generated by the sliding between conductive segments and contacts. This increases a resistance value and causes turbulence of output waveform, leading to deterioration of reliability of a liquid level detector.

Due to the current circumstances regarding fuels around the world, fuels having various formulations are frequently used, and it is necessary to provide a fuel gauge preventing the above obstacles and having reliability. In view of this, a technique of covering a part at which contacts of conductive segments slide, with an alloy containing gold (Au) in order to prevent deterioration and corrosion of the conductive segments and contacts is known (for example, see Patent Document 1, 2 and 3).

Patent Document 1: Japanese Patent Publication No. JP-A 2003-287456

Patent Document 2: Japanese Patent Publication No. JP-A 2009-162694

Patent Document 3: U.S. Pat. No. 6,681,628

However, in the inventions disclosed in PTL 1 and 2, the thickness of the covering layer of an alloy containing gold (Au) is decreased with the passage of time; therefore, effectiveness of the effect may not be sufficient. Furthermore, the inventions disclosed in PTL 1 and 2 had the problem that gold (Au) must be contained in a large amount in order to secure sufficient deterioration resistance and corrosion resistance, and this led to the problem of increase in costs.

Meanwhile, the conventional technologies disclosed in PTL 3 have effectiveness to corrosion and sulfurization, but have the problems that the effectiveness is not sufficient, and a large amount of gold (Au) is used, leading to the increase in costs.

SUMMARY

The present invention has been made in view of the above circumstances, and has an object to provide a method for producing a conductive segment capable of securing deterioration resistance and corrosion resistance in the use in ordinary environment and even in the used in the presence of a sulfur component such as gasoline, and giving high reliability to a detection value even in the case of using in, for example, a liquid level detector, and a conductive segment produced by the production method.

According to one aspect of the embodiments of the present invention, there is provided a method for producing a conductive segment, comprising: a step of printing a metal conductive paste on a substrate, and drying the paste; a step of printing other metal conductive paste on the metal conductive paste after drying, and drying the paste; and a step of burning the metal conductive paste after drying and the other metal conductive paste after drying, wherein the conductive metal paste is an Ag—Pd conductive paste comprising silver (Ag) and palladium (Pd), and the other metal conductive paste is an Au conductive paste comprising gold (Au) as a main component; or the metal conductive paste is an Au conductive paste comprising gold (Au) as a main component, and the other metal conductive paste is an Ag—Pd conductive paste comprising silver (Ag) and palladium (Pd).

According to another aspect of the embodiments of the present invention, there is provided A method for producing a conductive segment, comprising a step of printing a metal conductive paste on a substrate, drying the paste, and burning the paste; and a step of printing other metal conductive paste on the metal conductive paste after burning, drying the paste, and burning the paste, wherein the conductive metal paste is an Ag—Pd conductive paste comprising silver (Ag) and palladium (Pd), and the other metal conductive paste is an Au conductive paste comprising gold (Au) as a main component; or the metal conductive paste is an Au conductive paste comprising gold (Au) as a main component, and the other metal conductive paste is an Ag—Pd conductive paste comprising silver (Ag) and palladium (Pd).

The Au conductive paste may further comprise any one of platinum (Pt) and palladium (Pd).

The Ag—Pd conductive paste may further comprise any one of gold (Au) or platinum (Pt).

At least one of the Ag—Pd conductive paste and the Au conductive paste may further comprise a glass component.

According to another aspect of the embodiments of the present invention, there is provided a conductive segment comprising a region formed by an Ag—Pd conductive paste comprising silver (Ag) and palladium (Pd), and a region formed by an Au conductive paste comprising gold (Au) as a main component, those regions being laminated, wherein silver and palladium contained in the Ag—Pd conductive paste diffuse into the region formed by the Au conductive paste, and gold contained in the Au conductive paste diffuses into the region formed by the Ag—Pd conductive paste.

The gold (Au) content may be 30% by mass or more based on the total mass of the constituent metals, in the laminated region of the Ag—Pd conductive paste and the Au conductive paste.

In the conductive segment, gold (Au) may be contained in an amount of from 15 to 40% by mass and silver (Ag) may be contained in an amount of 40% by mass or less.

A film thickness after drying of the region formed by the Au conductive paste may be 20% or more in terms of film thickness ratio to the overall film thickness after drying of the first conductive region and the second conductive region.

The gold (Au) in the Au conductive paste may be contained in an amount of 95% by mass or more.

The conductive segment may be used for a liquid level detector, the liquid level detector comprising: a resistance plate having arranged thereon a plurality of long conductive segments, a float moving up and down according to displacement of liquid level to be measured, a float arm one end of which being fitted to the float, and other end of which being rotatably supported so as to rotate according to up-and-down movement of the float, and a contact sliding on a plurality of the conductive segment in conjunction with rotation of the float arm according to the liquid level.

According to the present invention, by burning an Ag—Pd conductive paste and an Au conductive paste laminated, silver and palladium contained in the Ag—Pd conductive paste diffuse into a region formed by the Au conductive paste, and gold contained in the Au conductive paste diffuses into a region formed by the Ag—Pd conductive paste. As a result, conductivity and abrasion resistance of the whole conductive segment are improved, and even though an insulating material is formed by sulfurization of the conductive segment itself or sulfurization of an abrasion powder generated by the sliding between conductive segments and contacts, increase in a resistance value and disturbance of output waveform can be suppressed.

Therefore, for example, when the conductive segment is used in a liquid level detector, a detection value can be obtained with high reliability. Furthermore, even in the use of the conductive segment in gasoline containing a large amount of sulfur components and fuels having various formulations, the conductive segment has sufficient deterioration resistance and corrosion resistance. In addition, gold (Au) is not required to use in a large amount, leading to low-cost production.

According to another present invention, by burning an Ag—Pd conductive paste and an Au conductive paste that were laminated, silver and palladium contained in the Ag—Pd conductive paste diffuse into a region formed by the Au conductive paste, gold contained in the Au conductive paste diffuses into a region formed by the Ag—Pd conductive paste, and the gold (Au) content becomes nearly uniform in a range of 30% or more from a surface layer to the vicinity of an intermediate layer in the conductive segment. As a result, the gold (Au) attaches to a contact that slides, thereby suppressing sulfurization, oxidization and corrosion of silver (Ag), and contact conduction between the contact and the conductive segment becomes good.

Accordingly, conductivity and abrasion resistance of the whole conductive segment are improved, and even though an insulating material is formed by sulfurization of the conductive segment itself and sulfurization of an abrasion powder generated by the sliding between the conductive segment and the contact, the increase in a resistance value and disturbance of output waveform can be suppressed.

Therefore, for example, when the conductive segment is used in a liquid level detector, a detection value can be obtained with high reliability. Furthermore, even in the use of the conductive segment in gasoline containing a large amount of sulfur components and fuels having various formulations, the conductive segment has sufficient deterioration resistance and corrosion resistance. In addition, gold (Au) is not required to use in a large amount, leading to low-cost production.

DETAILED DESCRIPTION OF EMBODIMENTS

Figure 1:
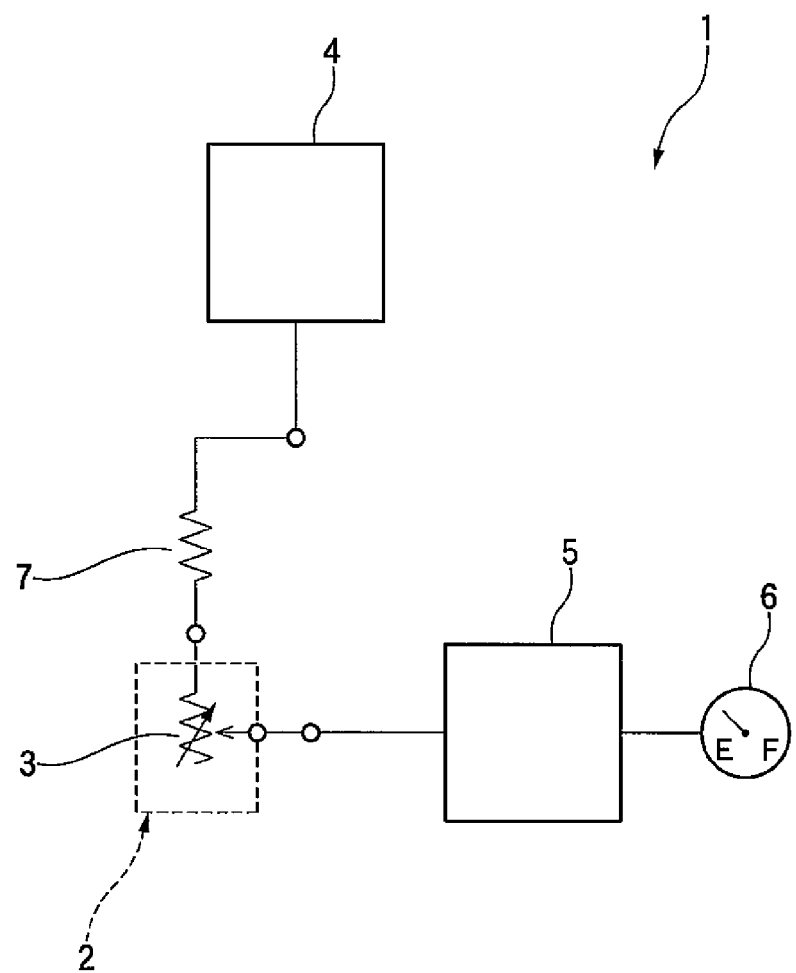
FIG. 1 is an electrical block diagram for explaining a structural example of a sensor used in a liquid level sensor.

The present invention is described in more detail below. The following embodiments explain an example that the conductive segment of the present invention has been applied to a liquid level detector, but the invention is not limited to the embodiments. Furthermore, in the present invention, a side of a resistance plate on which a conductive pattern is formed is determined as an "upper side".

(First Embodiment)

Now, referring to the drawings, a method for producing a conductive segment, and a conductive segment according to the first embodiment of the present invention will be described in detail. Fundamental structure regarding a liquid level detector is described in detail in the description of the prior art of the present specification by reference to FIGS. 1, 2 and 3, but is again described below.

As shown in FIG. 1, a sensor 2 of a liquid level detector 1 is equipped with a variable resistor 3 changing a resistance value in the course of movement of contacts 19 and 20 described hereinafter in conjunction with height transition of a liquid level in the inside T of a fluid tight vessel, and the variable resistor 3 is connected to a fixed resistor 7 in series and connected to a power circuit 4 applying a given voltage to the variable resistor 3 and the fixed resistor 7.

Figure 2:
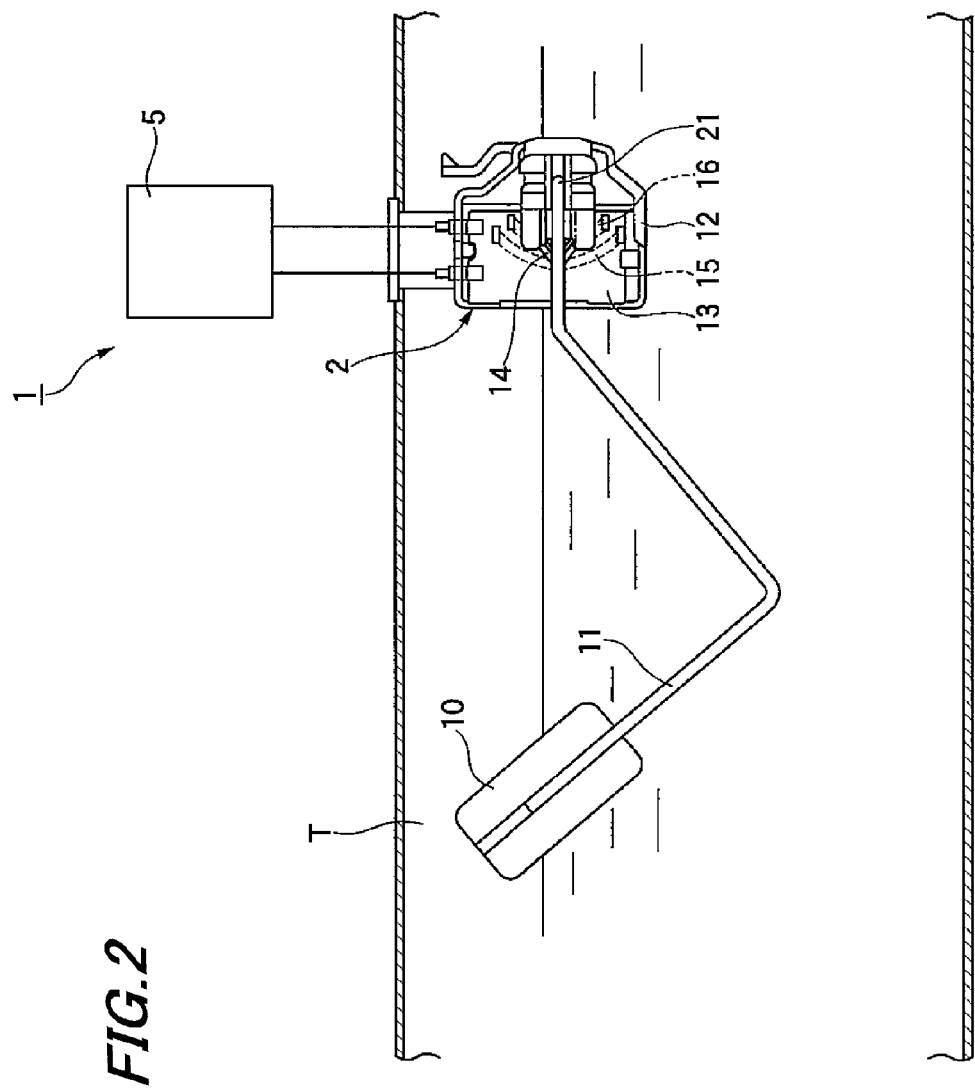
FIG. 2 is an explanatory view for explaining a structural example of a liquid level detector.
Figure 3:
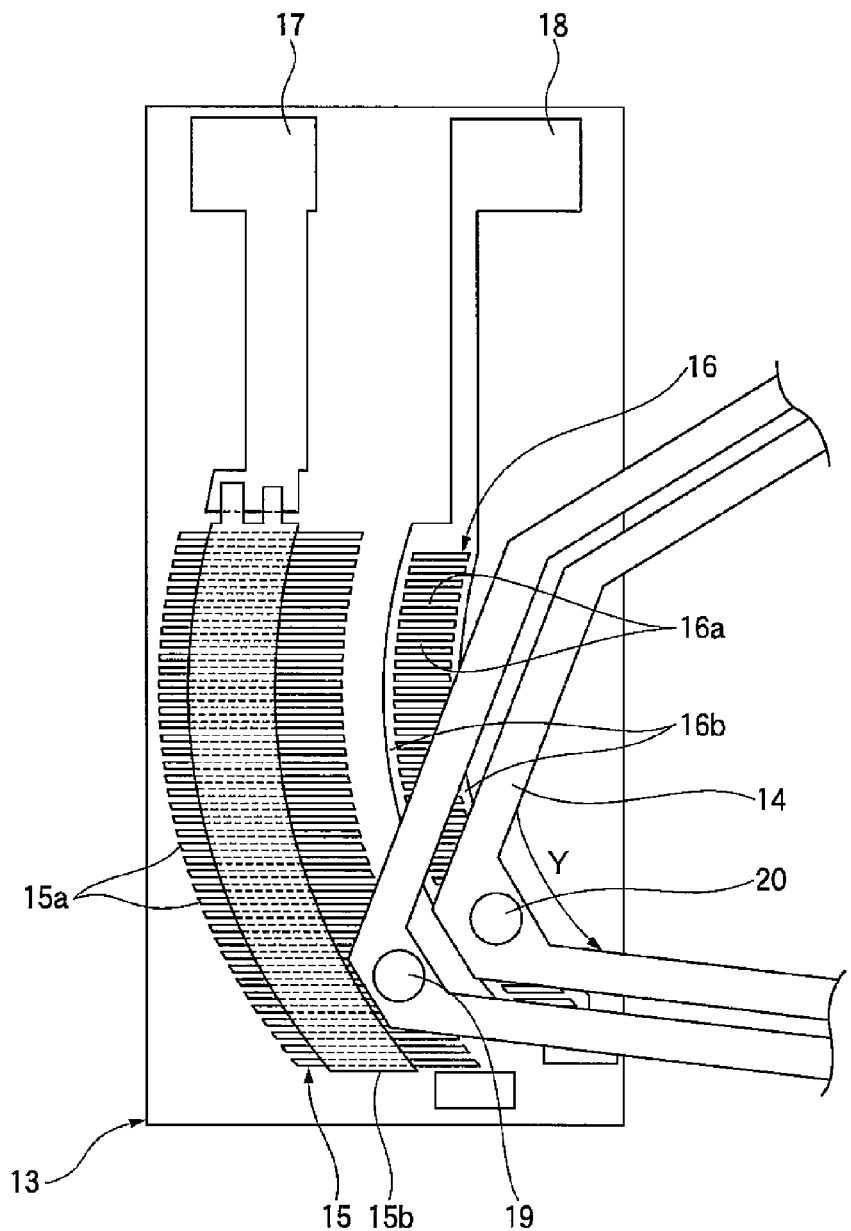
FIG. 3 is an explanatory view for explaining a structural example of a variable resistor in a sensor.

As shown in FIG. 2 and FIG. 3, the sensor 2 includes a body frame 12, a resistance plate 13 attached to the body frame 12, and a sliding body contactor 14. A base end section of a float arm 11 having attached to the tip thereof a float 10 floating on a liquid level by buoyancy of a liquid is connected to the sliding body contactor 14. The resistance plate 13 of the sensor 2 is provided with a first conductive pattern 15 and a second conductive pattern 16 as electrodes, and those two conductive patterns 15 and 16 are arranged in a state of being parallel to each other in an arc shape centering a rotation axis 21 of the float arm 11. An input-output conductive part 17 is connected to one end of the first conductive pattern 15, and an input-output conductive pattern 18 is connected to one end of the second conductive pattern 16.

The first conductive pattern 15 is constituted of a plurality of conductive segments 15a arranged at given intervals in a circumferential direction of the arc shape, and a resistor 15b electrically connecting the plurality of conductive segments 15a to each other. The second conductive pattern 16 is constituted of a plurality of conductive segments 16a arranged at given intervals in a circumferential direction of the arc shape, and a coupling body 16b electrically connecting a plurality of the conductive segments 16a to each other. The conductive segments 15a and 16a are formed as long members, and each of the conductive segments 15a and 16a is arranged such that the adjacent segments are nearly parallel to each other. Furthermore, the first conductive pattern 15 and the second conductive pattern 16 are arranged spacing to each other.

The sliding body contactor 14 is provided with two concentric frame bodies centering the base end section of the float arm 11, the two frame bodies are provided with the contacts 19 and 20, respectively, and the contacts 19 and 20 are electrically connected to each other. Further, the rotation axis 21 located at the base end section of the front arm 11 is connected to the sliding body contactor 14.

The float arm 11 circles in an arrow Y direction of FIG. 3 centering the rotation axis 21 when the float 10 floating on a liquid level moves to a lower position in response to the amount of liquid consumption, from the position of a liquid level when filled up. The sliding body contactor 14 also turns in an arrow Y direction of FIG. 3 in accordance with the turning of the float arm 11. By the turning motion of the sliding body contactor 14, the contact 19 electrically contacts while sliding on the conductive segment 15a arranged on the first conductive pattern 15, and the contact 20 electrically contacts while sliding on the conductive segment 16a arranged on the second conductive pattern 16. By this, length of the resistor 15b located in a circuit between the input-output conductive part 17 connected to the first conductive pattern 15 and the input-output conductive part 18 connected to the second conductive pattern 16 changes, and a resistance value of the circuit changes (that is, a resistance value of the variable resistor 3 in FIG. 1 changes). Thus, the variable resistor 3 is constituted of the first conductive pattern 15, the second conductive pattern 16 and the sliding body contactor 14.

When voltage is applied to the variable resistor 3, the sensor 2 detects potential difference between the input-output conductive parts 17 and 18 and outputs its output signal to a processing circuit 5, and the processing circuit 5 makes a residual amount of a liquid indicated on an indicator such as a meter 6 in analog display or bar graph display, based on an output signal of the sensor 2. In the meter 6, a fixed resistor may be arranged on a wiring to the processing circuit 5.

The conductive segment according to this embodiment of the present invention is particularly useful in the liquid level detector described above. However, other than the liquid level detector, the conductive segment can be used in a rotation angle sensor and a displacement sensor of an apparatus in a fuel.

A method for producing a conductive segment according to this embodiment of the present invention is described in detail below.

The method for producing the conductive segment of this embodiment includes a step of printing a metal conductive paste on a substrate, and drying the paste, a step of printing other metal conductive paste on the metal conductive paste after drying, and burning the metal conductive paste after drying and the other metal conductive paste after drying.

In the case that the conductive segment is applied to the liquid level detector described above, the substrate is exemplified by an aluminum oxide substrate, a PPS (Polyphenylene sulfide) resin substrate, and so on.

The metal conductive paste is an Ag—Pd conductive paste including silver (Ag) and palladium (Pd). The amount of various metals added in the Ag—Pd conductive paste can appropriately be determined, giving consideration to a set value of an amount of a metal in a conductive segment finally obtained. For example, it is preferred in the Ag—Pd conductive paste that silver (Ag) is contained in an amount of from 50 to 80% by mass and palladium (Pd) is contained in an amount of from 50 to 20% by mass, and it is more preferred that silver (Ag) is contained in an amount of from 60 to 70% by mass and palladium (Pd) is contained in an amount of from 40 to 30% by mass. When the amount of silver (Ag) falls within the above range, electroconductivity of the conductive segment can be made good, and when the amount of palladium (Pd) falls within the above range, abrasion resistance can be improved.

In this embodiment, other metals can be added to the Ag—Pd conductive paste so long as the advantageous effect of the present invention is not impaired. Examples of the other metals include gold (Au), platinum (Pt), cobalt (Co), nickel (Ni), ruthenium (Ru) and copper (Co). Those metals can be used in one kind alone or as mixtures of two kinds or more. Above all, any one of gold (Au) and platinum (Pt) is preferably used.

In general, a binder such as ethyl cellulose is preferably added to the Ag—Pd conductive paste.

Furthermore, according to the need, a solvent and the like can be added to the Ag—Pd conductive paste.

The Ag—Pd conductive paste can be obtained by sufficiently mixing various components described above.

The other metal conductive paste is an Au conductive paste including gold (Au) as a main component. The content of gold (Au) in the Au conductive paste can appropriately be determined, giving consideration to a set value of a content of gold in a conductive segment finally obtained. For example, in the Au conductive paste, gold (Au) is preferably contained in an amount of 95% by mass or more, and is more preferably contained in an amount of 98% by mass or more. When the content of gold (Au) in the Au conductive paste is 95% by mass or more, the conductive segment using the Au conductive paste can sufficiently increase deterioration resistance and corrosion resistance.

In this embodiment of the present invention, the Au conductive paste may contain other metals so long as the advantageous effect of the present invention is not impaired. Examples of the other metals include platinum (Pt), palladium (Pd), silver (Ag), cobalt (Co), nickel (Ni), ruthenium (Ru) and copper (Cu). Those metals can be used in one kind alone or as mixtures of two kinds or more. Above all, the Au conductive paste is preferable to contain any one of platinum (Pt) and palladium (Pd).

In general, a binder such as ethyl cellulose is preferably added to the Au conductive paste.

Furthermore, according to the need, a solvent and the like can be added to the Au conductive paste.

The Au conductive paste can be obtained by sufficiently mixing various components described above.

In the embodiment of the present invention, a glass component is preferably contained in at least one of the Ag—Pd conductive paste and the Au conductive paste. The presence of a glass component brings about the effect that hardness of the conductive segment is increased. Examples of the glass component include a lead borosilicate glass and bismuth oxide. The content of the glass component in each conductive paste can appropriately be determined, giving consideration to a set value of the content of a glass component in a conductive segment finally obtained, but is preferably from 10 to 30% by mass, and more preferably from 15 to 20% by mass.

Figure 4:
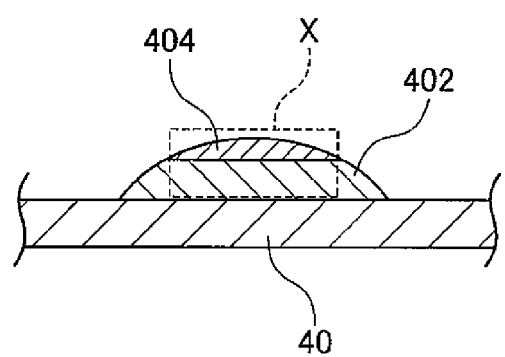
FIG. 4 is a schematic view showing a state after printing an Au conductive paste on an Ag—Pd conductive paste after drying, and drying the paste.

As the method for producing a conductive segment according to the embodiment of the present invention, the Ag—Pd conductive paste 402 is first printed on a substrate 40 and dried, as shown in FIG. 4. An Au conductive paste 404 is then printed on the Ag—Pd conductive paste 402 after drying, and dried.

A printing method of the Ag—Pd conductive paste 402 can use the conventional methods, and examples of the printing method include a screen printing method and the like. The drying temperature is preferably from 150 to 170° C., and more preferably from 155 to 165° C.

The printing method and drying conditions of the Au conductive paste 404 can be the same as the printing method and drying conditions of the Ag—Pd conductive paste 402.

The Ag—Pd conductive paste 402 is printed on the substrate 40 and dried, the Au conductive paste 404 is then printed thereon and dried, and a burning step is conducted. The method of burning a region formed by the Ag—Pd conductive paste and a region formed by the Au conductive paste can employ conventional methods, and the burning is conducted, for example, at a temperature of from 800 to 900° C. for from 10 to 15 hours.

In the embodiment of the present invention, by burning a region formed by the Ag—Pd conductive paste and a region formed by the Au conductive paste, the respective metal elements in the Ag—Pd conductive paste and the Au conductive paste diffuse in other regions. Specifically, silver and palladium contained in the Ag—Pd conductive paste diffuse in the region formed by the Au conductive region, and gold contained in the Au conductive paste diffuses in the region formed by the Ag—Pd conductive paste.

The conductive segment obtained by the method for producing a conductive segment according to the embodiment of the present invention is advantageous in that, particularly by diffusing palladium (Pd) in the region formed by the Ag—Pd conductive paste to the region formed by the Au conductive paste, which is an upper layer, abrasion resistance of the whole conductive segment is improved, and by diffusing gold (Au) in the Au conductive paste diffuses in the region formed by the Ag—Pd conductive paste, which is a lower layer, sulfurization deterioration, corrosion, oxidation and the like due to sulfur components are prevented. As a result, contact conductivity between conductive segments and contacts is maintained in good state, and contact hindrance of contacts can be prevented.

Furthermore, the conductive segment according to the embodiment of the present invention can suppress increase in resistance value and disturbance of output waveform even though an insulating material is formed by sulfurization of a conductive paste itself and sulfurization of an abrasion powder generated by the sliding between conductive segments and contacts.

In the embodiment of the present invention, amounts of the Ag—Pd conductive paste and Au conductive paste used are preferably designed such that each metal amount in the conductive segment finally obtained becomes a desired amount.

For example, the amount of gold (Au) in the conductive segment is preferably designed so as to be from 15 to 40% by mass, and more preferably designed so as to be from 20 to 40% by mass. When the content of gold (Au) falls within the above range, a conductive segment having excellent corrosion resistance can be obtained while keeping costs low.

Furthermore, the amount of silver (Ag) in the conductive segment is preferably designed so as to be 40% by mass or less. When the content of silver (Ag) falls within the above range, sufficient conductivity can be achieved.

The amount of palladium (Pd) in the conductive segment is preferably designed so as to be from 30 to 80% by mass, and more preferably designed so as to be from 40 to 70% by mass. When the amount of palladium (Pd) falls within the above range, the conductive segment can have excellent abrasion resistance.

In the embodiment of the present invention, it is important to design such that each metal amount in the conductive segment after burning is a given amount in a region of the Ag—Pd conductive paste and the Au conductive paste that have been laminated (a region indicated by X in FIG. 4, hereinafter referred to as a "region X").

For example, gold (Au) is contained in an amount of preferably 30% by mass or more, more preferably 40% by mass or more, and further preferably 50% by mass or more, based on the total mass of metals constituting the region X. When the content of gold (Au) in the region X falls within the above range, because gold is present in large amount in parts contacting contacts, corrosion generated due to abrasion by sliding can securely be prevented.

In the case of containing a glass component, the glass component is contained in an amount of preferably from 3 to 10% by mass, and more preferably from 3 to 5% by mass, based on the total mass of metals constituting the region X. When the content of the glass component in the region X falls within the above range, hardness of a part contacting the contacts can be increased, thereby a conductive segment having excellent abrasion resistance can be obtained.

In the method for producing a conductive segment according to the embodiment of the present invention, the Ag—Pd conductive paste and the Au conductive paste may separately be burned. Specifically, the Ag—Pd conductive paste is printed on a substrate, drying and a burning step are conducted, the Au conductive paste is printed on the Ag—Pd conductive paste after drying, and drying and a burning step are conducted.

The above embodiment has been described by reference to the example that the Ag—Pd conductive paste is printed on a substrate and the Au conductive paste is then lamination-printed thereon, but the order of lamination of metal conductive pastes is not limited to this order. In other words, an embodiment may be employed that the Au conductive paste is printed on a substrate and the Ag—Pd conductive paste is lamination-printed thereon.

EXAMPLES

The present invention is described in more detail below by examples, but the invention is not construed as being limited to the examples.

Test Example 1

Preparation of Conductive Segment

An Ag—Pd conductive paste was printed on an aluminum oxide substrate in an arc shape with a width of 0.2 mm in intervals of about 0.2 mm. The paste was dried by heating at 160° C.

An Au conductive paste was printed on an upper surface of the Ag—Pd conductive paste by a screen printing so as to have a width of 0.15 mm, and dried by heating at 160° C.

Those pastes laminated were burned at 800° C. for 15 hours in a baking furnace to prepare a conductive segment.

Figure 5:
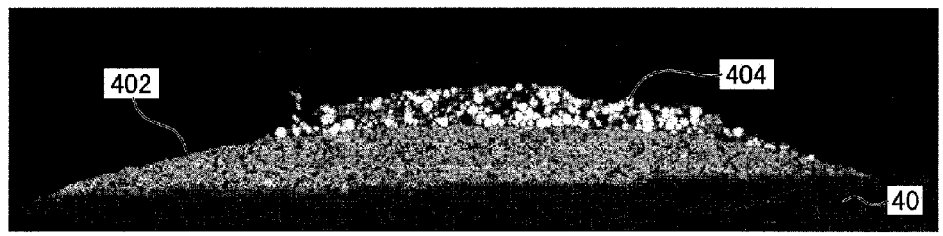
FIG. 5 is a micrograph showing a state after printing an Au conductive paste on an Ag—Pd conductive paste after drying, and drying the paste.
Figure 6:
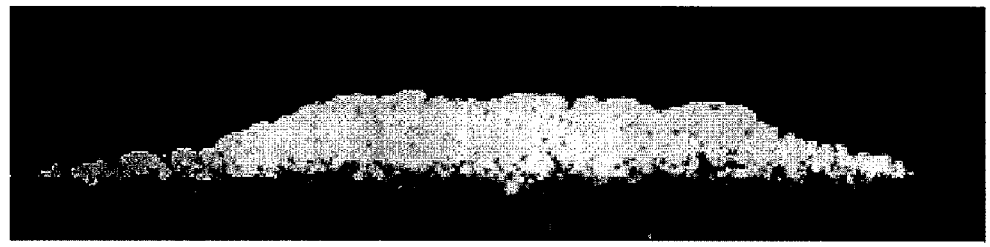
FIG. 6 is a micrograph showing a state after burning a region formed by an Ag—Pd conductive paste and a region formed by an Au conductive paste, after laminating.

FIG. 5 is a micrograph showing a state after printing an Au conductive paste on an Ag—Pd conductive paste after drying, and then drying, and FIG. 6 is a micrograph of a state after burning a region formed by an Ag—Pd conductive paste and a region formed by an Au conductive paste.

As is apparent from FIG. 5, it could be confirmed that the Ag—Pd conductive paste 402 and the Au conductive paste 404 are clearly laminated before burning, and as shown in FIG. 6, it could be confirmed that after burning, the respective metal elements in the region formed by the Ag—Pd conductive paste and the region formed by the Au conductive paste, particularly, metal elements in the boundary region, diffuse into other regions, and are metallized.

Regarding distribution of gold (Au), silver (Ag) and palladium (Pd) in a thickness direction of a conductive segment after burning in a region obtained by laminating the Ag—Pd conductive paste and the Au conductive paste (a region indicated by X in FIG. 4, hereinafter referred to as a "region X"), each metal content at five points (point 1 to point 5) of from a substrate side to a surface side of the conductive segment was measured with quantitative analysis of elements (EDX). The results are shown in FIG. 7.

Figure 7:
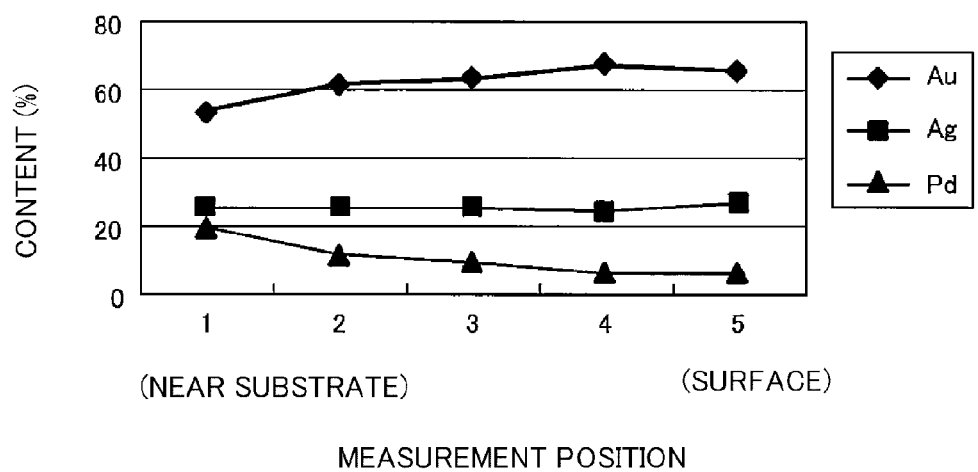
FIG. 7 is a graph showing distribution of gold (Au), silver (Ag) and palladium (Pd) in a thickness direction of a conductive segment after burning a region formed by an Ag—Pd conductive paste and a region formed by an Au conductive paste, after laminating.

As is seen from FIG. 7, the gold content at the point 1 nearest the substrate was 54%, and the gold content at the point 5 near the surface was 66%. The contents of other metals, silver and palladium, are almost constant from the substrate side of a conductive segment to the surface side thereof. From this fact, it was confirmed that the respective metal elements in the region formed by the Ag—Pd conductive paste and the region formed by the Au conductive paste diffuse in the respective regions.

Test Example 2

Preparation of Conductive Segment

Five aluminum oxide substrates were prepared, and an Ag—Pd conductive paste was printed on each substrate in an arc shape with a width of 0.2 mm at intervals of about 0.2 mm by screen printing. The paste was then dried by heating at 160° C.

Au conductive paste having different content of gold (Au) was printed on the upper surface of the respective Ag—Pd conductive pastes so as to have a width of 0.15 mm by screen printing. The paste was dried by heating at 160° C.

Those pastes laminated were burned at 800° C. for 15 hours in a baking furnace to prepare conductive segments (Samples 1 to 5).

In Samples 1 to 5, the content of gold (Au) in the laminated region of the Ag—Pd conductive paste and Au conductive paste (region X in FIG. 4) and variation of resistance value of conductive segments were measured.

The content of gold was measured by the same method as in Test Example 1 above.

The variation of resistance value of each conductive segment was obtained by measuring resistance values before and after a sulfurization resistance sliding test using a fuel for test having excessively increased sulfur concentration, to conductive segments obtained. Specifically, a fuel containing 200 ppm by mass of sulfur and the remainder being alcohol blended gasoline was used, and a sliding test was conducted to obtain the degree of change of a resistance value after the sliding test with respect to the resistance value of the conductive segment before the sliding test, by a contact sliding test in a test fuel, and the variation was obtained in percentage.

Figure 8:
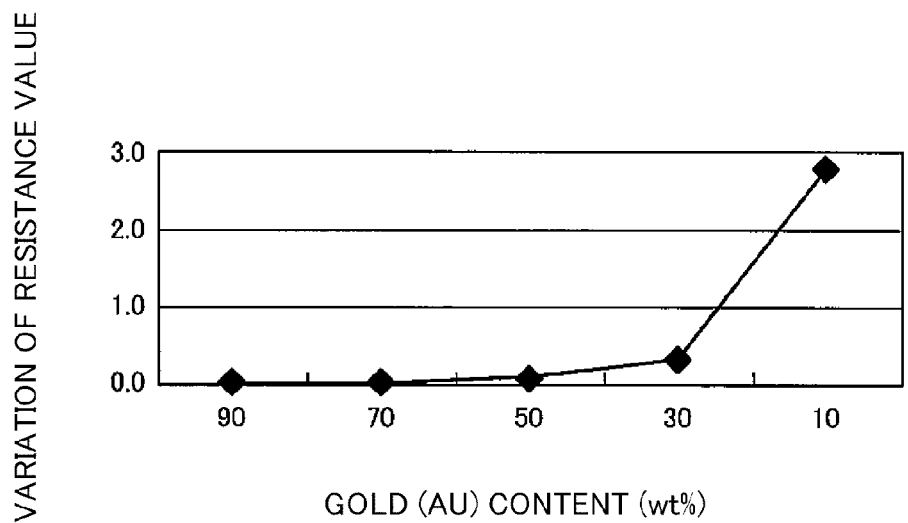
FIG. 8 is a graph showing variation of resistance value of a conductive segment in the Examples.
Figure 9:
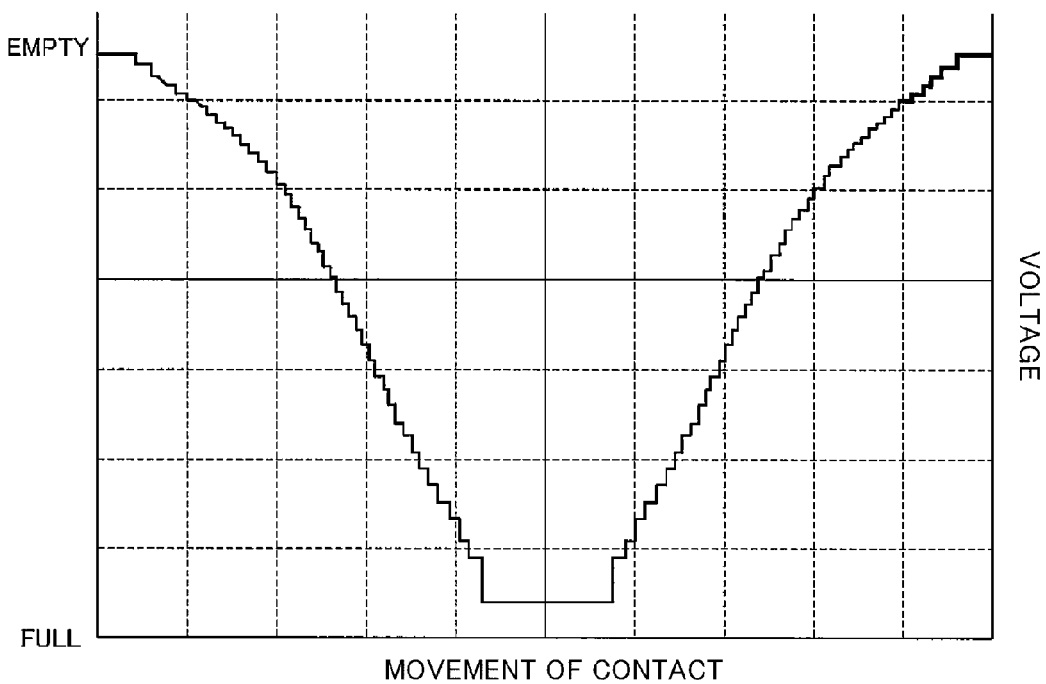
FIG. 9 is a view showing one example of an output waveform in the case of using a conductive segment having a gold (Au) content in the whole conductive segments of 30% by mass or more, in a liquid level detector.
Figure 10:
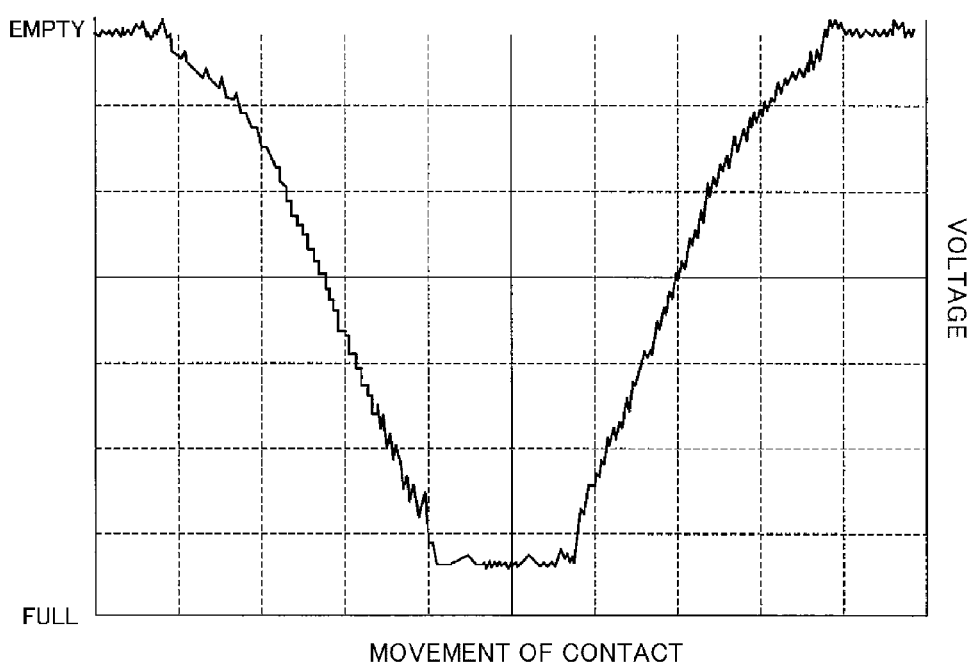
FIG. 10 is a view showing one example of an output waveform in the case of using the conventional conductive segment in a liquid level detector.

The results obtained are shown in Table 1 and FIGS. 8 to 10.

TABLE 1

|  | Gold (Au) content (%) |
| --- | --- |
| Sample 1 | 90 |
| Sample 2 | 70 |
| Sample 3 | 50 |
| Sample 4 | 30 |
| Sample 5 | 10 |

As shown in Table 1 and FIG. 8, it was seen that when the content of gold (Au) in the whole conductive segments is 30% by mass or more, variation of resistance value is small. Small variation of resistance value suppresses disturbance of output waveform.

FIG. 9 is a view showing one example of an output waveform in the case that a conductive segment having the content of gold (Au) in the whole conductive segments of 50% by mass has been used in a liquid level detector. FIG. 10 is an output waveform in the case of using the conventional conductive segment in a liquid level detector, as a reference.

As is apparent from FIG. 9 and FIG. 10, it was seen that the output waveform of a liquid level detector using the conductive segment of the present invention is that disturbance of waveform is suppressed as compared with that of the conventional output waveform, and detection value having high reliability is obtained.

(Second Embodiment)

Now, referring to the drawings, a method for producing a conductive segment, and a conductive segment according to the second embodiment of the present invention will be described in detail. The components which are substantially identical with or similar to those of the first embodiment are denoted by the same reference numerals, and duplicated description is omitted.

In this embodiment of the present invention, the conductive segment is constituted of a metal conductive material containing at least silver (Ag) and palladium (Pd), and a metal conductive material comprising gold (Au) as a main component.

The amounts of various metals added in the metal conductive material containing at least silver (Ag) and palladium (Pd) (hereinafter referred to as "Ag—Pd conductive paste") can appropriately be determined, giving consideration to designed values of amounts of metals in a conductive segment finally obtained. For example, it is preferred in the Ag—Pd conductive paste that silver (Ag) is contained in an amount of from 50 to 80% by mass and palladium (Pd) is contained in an amount of from 20 to 50% by mass, and it is more preferred that silver (Ag) is contained in an amount of from 60 to 70% by mass and palladium (Pd) is contained in an amount of from 30 to 40% by mass. When the amount of silver (Ag) falls within the above range, electroconduction of the conductive segment can be made good, and when the amount of palladium (Pd) falls within the above range, abrasion resistance can be improved.

In the present embodiment, other metals can be added to the Ag—Pd conductive paste so long as the advantageous effect of the present invention is not impaired. Examples of the other metals include gold (Au), platinum (Pt), cobalt (Co), nickel (Ni), ruthenium (Ru) and copper (Co). Those metals can be used in one kind alone or as mixtures of two kinds or more. Above all, any one of gold (Au) and platinum (Pt) is preferably used.

In general, a binder such as ethyl cellulose is preferably added to the Ag—Pd conductive paste.

Furthermore, according to the need, a solvent and the like can be added to the Ag—Pd conductive paste. The Ag—Pd conductive paste can be obtained by sufficiently mixing various components described above.

The content of gold (Au) in the metal conductive material comprising gold (Au) as a main component (hereinafter referred to as an "Au conductive paste") can appropriately be determined, giving consideration to a set value of a content of gold in a conductive segment finally obtained. For example, in the Au conductive paste, gold (Au) is preferably contained in an amount of 95% by mass or more, and is more preferably contained in an amount of 98% by mass or more. When the content of gold (Au) in the Au conductive paste is 95% by mass or more, the conductive segment using the Au conductive paste can sufficiently increase deterioration resistance and corrosion resistance.

In the present embodiment, the Au conductive paste may contain other metals so long as the advantageous effect of the present invention is not impaired. Examples of the other metals include platinum (Pt), palladium (Pd), silver (Ag), cobalt (Co), nickel (Ni), ruthenium (Ru) and copper (Cu). Those can be used in one kind alone or as mixtures of two kinds or more. Above all, use of any one of platinum (Pt) and palladium (Pd) is preferred.

In general, a binder such as ethyl cellulose is preferably added to the Au conductive paste.

Furthermore, according to the need, a solvent and the like can be added to the Au conductive paste.

The Au conductive paste can be obtained by sufficiently mixing various components described above.

In the present embodiment, a glass component is preferably contained in at least one of the Ag—Pd conductive paste and the Au conductive paste. The presence of a glass component brings about the effect that hardness of a conductive segment is increased. Examples of the glass component include a lead borosilicate glass and bismuth oxide. The content of the glass component in each conductive paste can appropriately be determined, giving consideration to a set value of the content of a glass component in a conductive segment finally obtained, but is preferably from 10 to 30% by mass, and more preferably from 15 to 20% by mass.

The conductive segment of the present embodiment can be prepared by printing the Ag—Pd conductive paste or the Au conductive paste on a substrate (resistance plate), and drying or further burning the paste to form a first conductive region, printing and laminating the Au conductive paste on the first conductive region when the first conductive region has been formed by the Ag—Pd conductive paste or printing and laminating the Ag—Pd conductive paste on the first conductive region when the first conductive region has been formed by the Au conductive paste, to form a second conductive region, drying and then burning.

In the case of applying the conductive segment to the liquid level detector, examples of the substrate include an aluminum oxide substrate and a PPS (polyphenylene sulfide) resin substrate.

Figure 11:
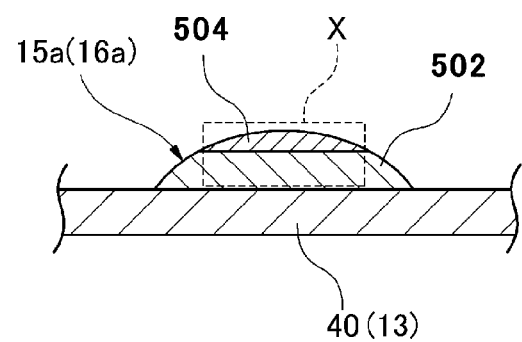
FIG. 11 is a schematic view showing a state after printing an Au conductive paste on an Ag—Pd conductive paste after drying, and drying the paste.

Specifically, as shown in FIG. 11, the Ag—Pd conductive paste 502 is first printed on a substrate (resistance plate) 40, and dried (first conductive region). An Au conductive paste 504 is then printed on the Ag—Pd conductive paste 502 after drying, and dried (second conductive region).

A printing method of the Ag—Pd conductive paste 502 can use the conventional methods, and examples of the printing method include a screen printing method and the like. The drying temperature is preferably from 150 to 170° C., and more preferably from 155 to 165° C.

The printing method and drying conditions of the Au conductive paste 504 can be the same as the printing method and drying conditions of the Ag—Pd conductive paste 502.

The Ag—Pd conductive paste 502 is printed on the substrate 40 and dried, the Au conductive paste is then printed thereon and dried, and a burning step is conducted. The method of burning a region formed by the Ag—Pd conductive paste and a region formed by the Au conductive paste can use the conventional methods, and the burning is conducted, for example, at a temperature of from 800 to 900° C. for from 10 to 15 hours.

In the present embodiment, by burning the first region and the second region that were laminated, the respective metal elements in the Ag—Pd conductive paste and the Au conductive paste diffuse in other regions. Specifically, silver (Ag) and palladium (Pd) contained in the Ag—Pd conductive paste diffuse and are distributed in the region formed by the Au conductive region, and gold (Au) contained in the Au conductive paste diffuses and is distributed in the region formed by the Ag—Pd conductive paste.

In the present embodiment, the conductive segment is that the gold (Au) content is nearly uniform in an amount of 30% by mass or more from its surface layer to the vicinity of an intermediate layer. The gold content corresponds to a film thickness of the region formed by the Au conductive paste and a gold content in the Au conductive paste, and the gold content of from the surface layer to the vicinity of the intermediate layer in the conductive segment after burning is increased with increasing the thickness of the Au conductive pate and with increasing the gold content in the Au conductive paste. The gold content in the region formed by the Au conductive paste by the burning step becomes nearly uniform in a portion of from the surface layer of the conductive segment to the vicinity of the intermediate layer thereof. The gold content in a portion of from the surface layer of the conductive segment after burning to the vicinity of the intermediate layer thereof is preferably from 30 to 90% by mass, and more preferably from 40 to 70% by mass. When the gold content in a portion of from the surface layer of the conductive segment after burning to the vicinity of the intermediate layer thereof is nearly uniform in a range of 30% by mass or more, practical sulfurization resistance can be secured, which is preferred.

The film thickness after drying of the region formed by the Au conductive paste is preferably 20% or more in terms of a film thickness ratio, of the overall thickness after drying of the first conductive region and the second conductive region, that is, the thickness of the conductive segment.

According to the embodiment of the present invention, amounts of the Ag—Pd conductive paste and Au conductive paste used are preferably designed such that each metal amount in the conductive segment finally obtained becomes a desired amount.

For example, the amount of gold (Au) in the conductive segment is preferably designed so as to be from 30 to 90% by mass, and more preferably designed so as to be from 40 to 70% by mass. When the content of gold (Au) falls within the above range, a conductive segment having excellent corrosion resistance can be obtained while keeping costs low.

Furthermore, the amount of silver (Ag) in the conductive segment is preferably designed so as to be 40% by mass or less. When the content of silver (Ag) falls within the above range, sufficient conductivity can be secured.

The amount of palladium (Pd) in the conductive segment is preferably designed so as to be from 20 to 50% by mass, and more preferably designed so as to be from 30 to 40% by mass. When the amount of palladium (Pd) falls within the above range, the conductive segment can have excellent abrasion resistance.

According to the conductive segment of the present embodiment, particularly by that palladium (Pd) in the region formed by the Ag—Pd conductive paste diffuses in the region formed by the Au conductive paste, abrasion resistance of the whole conductive segment is improved, and by that gold (Au) in the Au conductive paste diffuses in the region formed by the Ag—Pd conductive paste, sulfurization deterioration, corrosion, oxidation and the like due to sulfur components are prevented. As a result, contact conductivity between the conductive segment and the contact is maintained in good state, and contact hindrance of the contacts can be prevented. Specifically, the gold (Au) component of the Au conductive paste attaches to the contacts that slide, and good conduction range is expanded. As a result, influence by sulfurization, oxidation and corrosion of the silver (Ag) component of the conductive segment is suppressed. For this reason, contact conductivity between the contacts and the surface layer of the conductive segment, that is, the second conductive region, becomes good. In the present invention, the amount of Au attached to the contacts that slide is preferably 3% by mass or more based on the mass of the contact base material. When the amount of Au attached is 3% by mass or more, conductivity of gold (Au) effectively functions, and contact property to a conductor is improved. The amount of Au attached is an amount measured with SEM EDX quantitative elemental analysis.

Therefore, the conductive segment of the present embodiment can suppress increase in resistance value and disturbance of output waveform even though an insulating material is formed by sulfurization of a conductive paste itself and sulfurization of an abrasion powder generated by the sliding between conductive segments and contacts.

In the method for producing a conductive segment of the present invention, the Ag—Pd conductive paste (first conductive region) and the Au conductive paste (second conductive region) may separately be burned. Specifically, the Ag—Pd conductive paste is printed on a substrate and dried, and a burning step is further conducted. Thereafter, the Au conductive paste is printed on the Ag—Pd conductive paste after burning, and dried, and a burning step can be conducted.

The above embodiment has been described by reference to the example that the Ag—Pd conductive paste is printed on a substrate to form a first conductive region and the Au conductive paste is then lamination-printed thereon to form a second conductive region, but the order of lamination of metal conductive pastes is not limited to this order. In other words, an embodiment may be employed that the Au conductive paste is printed on a substrate and the Ag—Pd conductive paste is lamination-printed thereon.

EXAMPLES

The present invention is described in more detail below by examples, but the invention is not construed as being limited to the examples.

Test Example 1

Preparation of Conductive Segments A to D

An Ag—Pd conductive paste (Ag: 60% by mass, Pd: 20% by mass, glass as paste: 20% by mass, total being 100% by mass) was printed on an aluminum oxide substrate by a screen printing in an arc shape so as to have a width of 0.2 mm, intervals of about 0.2 mm and a dry thickness (estimate value) shown in Table 1, thereby a first conductive region was formed. The first conductive region was dried by heating at 160° C.

An Au conductive paste (Au: 93% by mass, glass as paste: 7% by mass, total being 100% by mass) was printed on an upper surface of the Ag—Pd conductive paste by a screen printing so as to have a width of 0.15 mm and a dry thickness (estimate value) shown in Table 1 to form a second conductive region, and the second conductive region was dried by heating at 160° C.

Those pastes laminated were burned at from 800 to 900° C. for from 10 to 15 hours in a baking furnace to prepare conductive segments A to D of the present invention.

The conventional conductive segment E was prepared as Comparative Example.

An Ag—Pd conductive paste (Ag: 60% by mass, Pd: 20% by mass, glass as paste: 20% by mass, total being 100% by mass) was printed on an aluminum oxide substrate by a screen printing in an arc shape so as to have a width of 0.2 mm, intervals of about 0.2 mm and a dry thickness (estimate value) of 7 μm, thereby a first conductive region was formed. The first conductive region was dried by heating at 160° C.

An Au conductive paste (Au: 93% by mass, glass as paste: 7% by mass, total being 100% by mass) was printed on an upper surface of the Ag—Pd conductive paste by a screen printing so as to have a width of 0.15 mm and a dry thickness (estimate value) of 1 μm to form a second conductive region, and the second conductive region was dried by heating at 160° C.

Those pastes laminated were burned at from 800 to 900° C. for from 10 to 15 hours in a baking furnace to prepare conductive segment E.

TABLE 1

Film thickness ratio (estimate value) between first conductive region and second conductive region, after drying

| Conductive segment | Film thickness of first conductive region (μm) | Film thickness of second conductive region (μm) | Film thickness ratio of second conductive region (%) |
|---|---|---|---|
| A | 7 | 7 | 50 |
| B | 7 | 5 | 40 |
| C | 7 | 3 | 30 |
| D | 7 | 2 | 20 |
| E | 7 | 1 | 10 |

It could be confirmed by the not shown but similar micrograph with FIG. 5 that the Ag—Pd conductive paste 502 and the Au conductive paste 504 are laminated before burning, and it could be confirmed by the not shown but similar micrograph with FIG. 6 that after burning, the respective metal elements in the region formed by the Ag—Pd conductive paste and the region formed by the Au conductive paste, particularly, metal elements in the boundary region, diffuse into other regions, and are metallized.

Measurement of Gold (Au)

Regarding the conductive segments A to E, each film thicknesses of each Au conductive paste at a position of a film having the maximum thickness (central part) of the second conductive region was measured. The gold (Au) content was A: 65% by mass, B: 60% by mass, C: 50% by mass, and D: 40% by mass. The relationship of the Au content to the film thickness ratio in the second conductive region is shown in FIG. 12.

Figure 13:
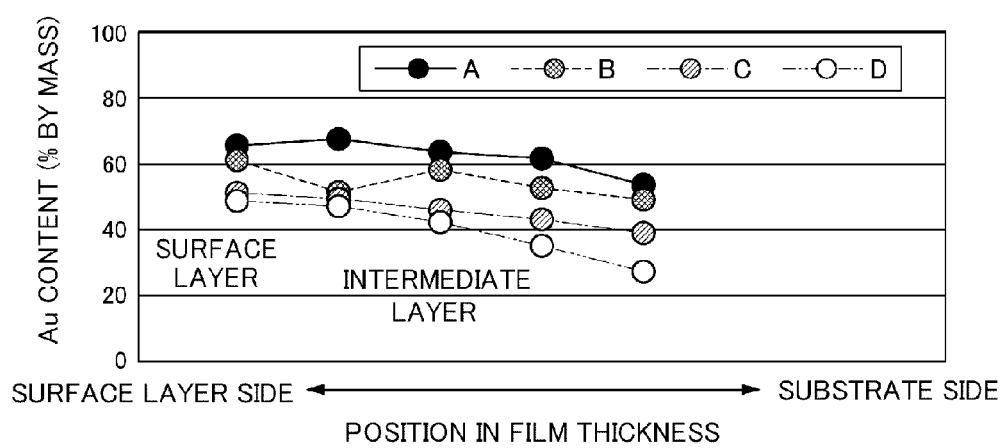
FIG. 13 is a view showing an Au content (% by mass) in a film thickness direction of the conductive segment according to the second embodiment of the present invention.

Regarding distribution of gold (Au) in a thickness direction of a conductive segment after burning in a region obtained by laminating the Ag—Pd conductive paste and the Au conductive paste (a region indicated by X in FIG. 11, hereinafter referred to as a "region X"), Au content at five points of from a substrate side to a surface side of the conductive segment was measured with quantitative elemental analysis (EDX). The results are shown in FIG. 13.

Figure 12:
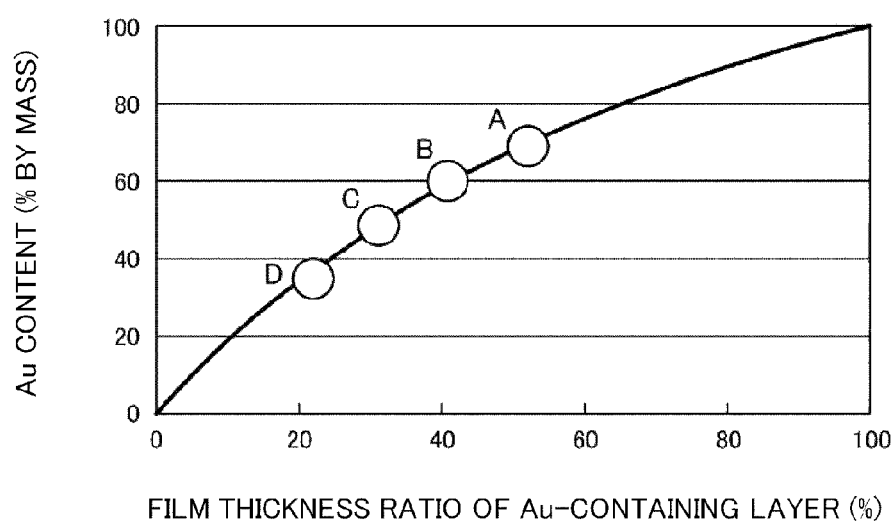
FIG. 12 is a view showing the relationship between a film thickness ratio (%) of an Au-containing layer film and an Au content (% by mass) in the conductive segment according to the second embodiment of the present invention.

It was seen from FIG. 12 that the Au film thickness ratio and the Au content have nearly proportional relationship. As is seen from FIG. 13, the Au content was from about 30 to 60% at the point nearest the substrate, from about 50 to 70% at the point near the surface layer and from about 40 to 60% in the vicinity of the intermediate layer. It was further seen that the Au content is nearly uniform from the surface layer to the vicinity of the intermediate layer. Amount of gold (Au) attached to contacts Contacts were slide on a conductive segment under the practical contact pressure application conditions, and an amount of Au attached to the contacts was observed with EDX quantitative elemental analysis. The results are shown in FIGS. 14 and 15.

Figure 14:
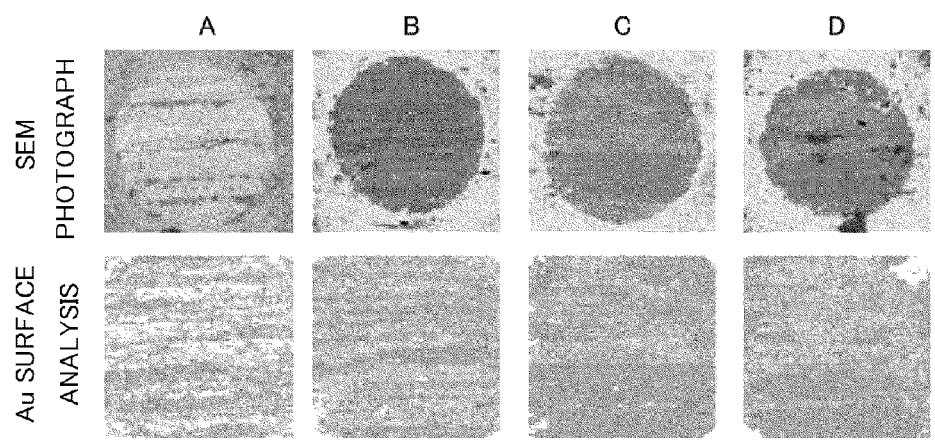
FIG. 14 is a view obtained by observing an amount of Au attached to a contact of a liquid level detector with surface analysis (mapping) and EDX quantitative elemental analysis.
Figure 15:
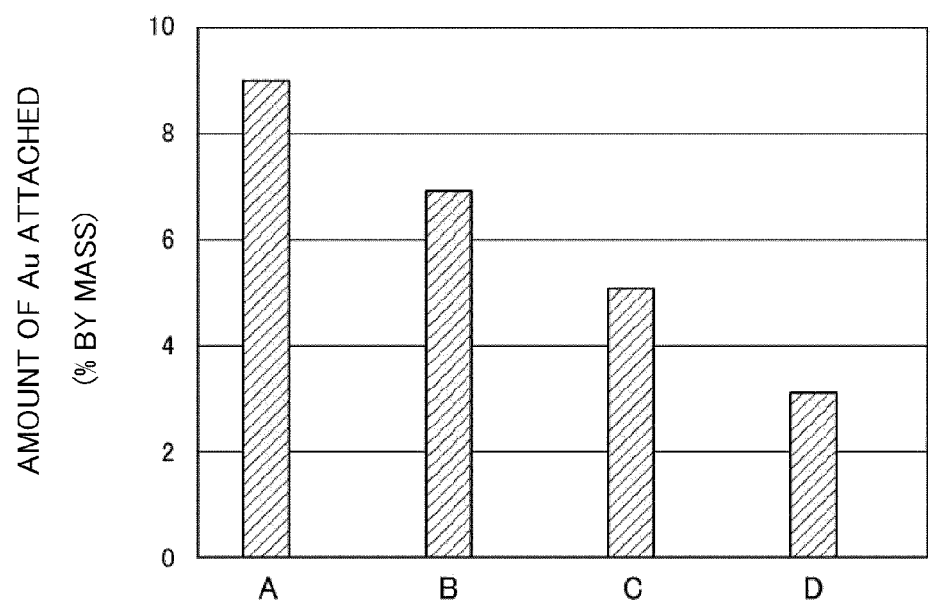
FIG. 15 is a view showing an amount (% by mass) of Au attached to a contact of a liquid level detector.

It was seen from FIGS. 14 and 15 that attachment of Au is observed in the contacts, the attachment amount is increased with increasing the Au content in the conductive segment, and even in the conductive segment D of the present invention, the attachment amount of Au is 3% by mass in a contact base material ratio, which is practicable.

Measurement of Variation of Resistance Value of Conductive Segment

Regarding the conductive segments A to E, the gold (Au) content in the region (region X in FIG. 11) comprising the Ag—Pd conductive paste and the Au conductive paste that were laminated, and the variation of resistance value of the conductive segment were measured. The results are shown in FIG. 16.

Figure 16:
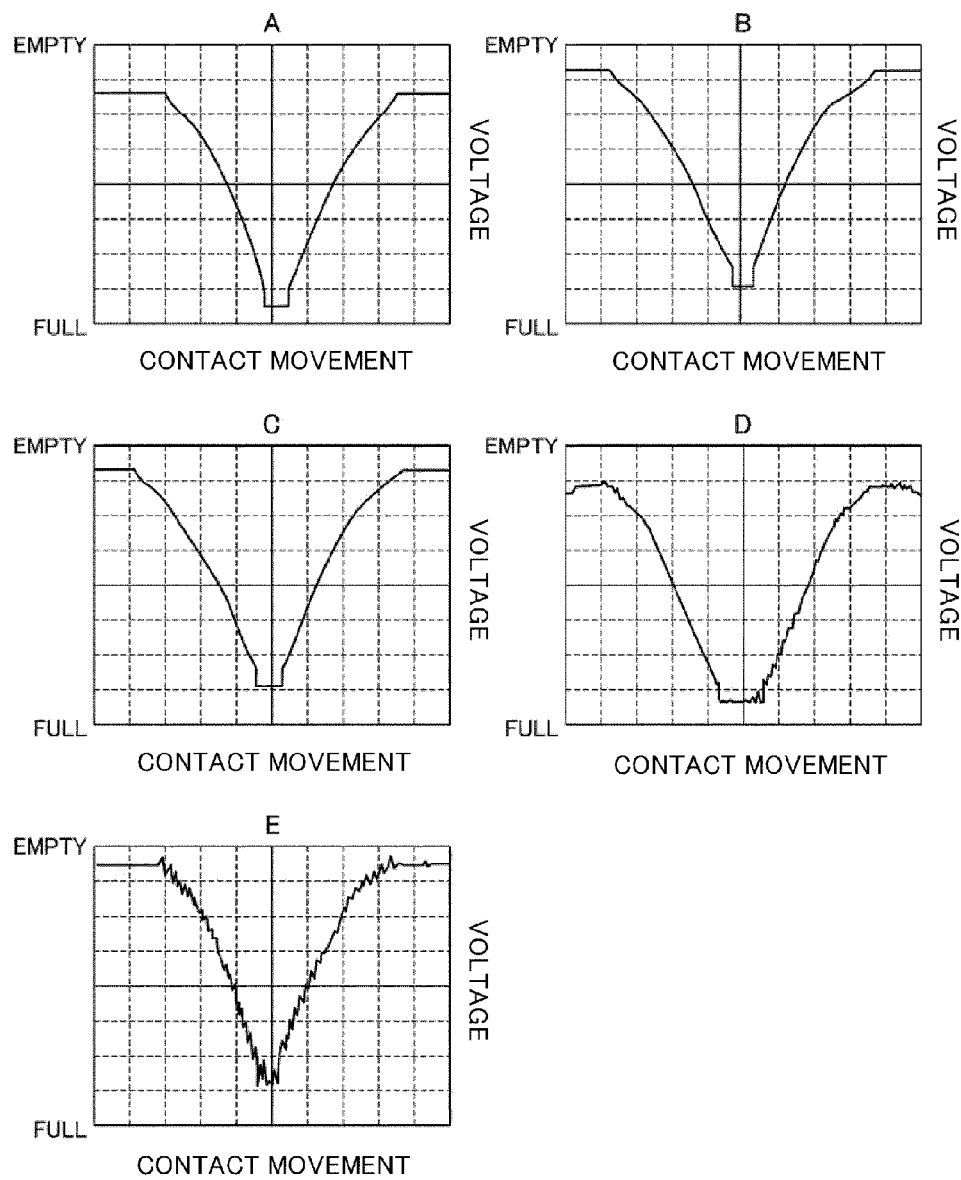
FIG. 16 is a view showing output waveform when the conductive segments of the present invention and Comparative Examples were used in a liquid level detector.

From FIG. 16, disturbance (degree of jag) of output waveform that is a measure of sulfurization resistance is that the conductive segment E is remarkable, whereas the disturbance of the conductive segment D of the present invention is decreased, which is effective. The conductive segments A to C are that disturbance of waveform is not observed at all and this is better. The reason that disturbance of output waveform is decreased or is not observed at all is that gold (Au) contained in the second conductive region converts into an abrasion powder and the powder is attached to contacts. Gold (Au) is a metal that is difficult to generate corrosion and maintains conductivity. Therefore, conductivity of an abrasion powder attached is increased with increasing the amount of gold (Au) attached.

The present application is based on Japanese patent applications No. 2011-162465 filed on Jul. 25, 2011, No. 2011-193012 filed on Sep. 5, 2011, and the contents of the patent application are hereby incorporated by reference.

Industrial Applicability

The conductive segment of the present invention can effectively be utilized in a liquid level detector automatically detecting a residual amount of a liquid retained in a transportation fuel tank of automobiles, aircraft and the like, from a position of the liquid.

What is claimed is:

1. A method for producing a conductive segment, comprising:
    a step of printing a metal conductive paste on a substrate, and drying the paste;
    a step of printing other metal conductive paste on the metal conductive paste after drying, and drying the paste; and
    a step of burning the metal conductive paste, for at least 10 hours at a temperature of more than 800° C. to 900° C., after drying and the other metal conductive paste after drying,
    wherein the metal conductive paste is an Ag—Pd conductive paste comprising silver (Ag) and palladium (Pd), and the other metal conductive paste is an Au conductive paste comprising gold (Au) as a main component; or
    the metal conductive paste is an Au conductive paste comprising gold (Au) as a main component, and the other metal conductive paste is an Ag—Pd conductive paste comprising silver (Ag) and palladium (Pd).

2. A method for producing a conductive segment, comprising:
    a step of printing a metal conductive paste on a substrate, drying the paste, and burning the paste; and
    a step of printing other metal conductive paste on the metal conductive paste after burning, drying the paste,
    a second step of burning the metal conductive paste at a temperature of more than 800° C. to 900° C. for more than 10 hours to diffuse the metal conductive paste into a region formed by the other metal conductive paste, and the other metal conductive paste into a region of the metal conductive paste,
    wherein the metal conductive paste is an Ag—Pd conductive paste comprising silver (Ag) and palladium (Pd), and the other metal conductive paste is an Au conductive paste comprising gold (Au) as a main component; or
    the metal conductive paste is an Au conductive paste comprising gold (Au) as a main component, and the other metal conductive paste is an Ag—Pd conductive paste comprising silver (Ag) and palladium (Pd),
    wherein diffusion of the metal conductive paste occurs during the second step of burning, and the second step of burning is conducted after the step of printing and drying the other metal conductive paste.

3. The method for producing a conductive segment according to claim 1, wherein the Au conductive paste further comprises any one of platinum (Pt) and palladium (Pd).

4. The method for producing a conductive segment according to claim 1, wherein the Ag—Pd conductive paste further comprises any one of gold (Au) or platinum (Pt).

5. The method for producing a conductive segment according to claim 1, wherein at least one of the Ag—Pd conductive paste and the Au conductive paste further comprises a glass component.

6. The method for producing a conductive segment according to claim 2, wherein the Au conductive paste further comprises any one of platinum (Pt) and palladium (Pd).

7. The method for producing a conductive segment according to claim 2, wherein the Ag—Pd conductive paste further comprises any one of gold (Au) or platinum (Pt).

8. The method for producing a conductive segment according to claim 2, wherein at least one of the Ag—Pd conductive paste and the Au conductive paste further comprises a glass component.

* * * * *